United States Patent
Cardell et al.

(10) Patent No.: US 10,071,802 B2
(45) Date of Patent: Sep. 11, 2018

(54) MOUNTING DEVICE FOR ELECTRONIC COMPONENTS IN UAV HELICOPTERS

(75) Inventors: Per-Erik Cardell, Linköping (SE); Andreas Johansson, Linghem (SE)

(73) Assignee: UMS Skeldar Sweden AB, Linköping (SE)

( * ) Notice: Subject to any disclaimer, the term of this patent is extended or adjusted under 35 U.S.C. 154(b) by 1030 days.

(21) Appl. No.: 13/513,706

(22) PCT Filed: Dec. 2, 2009

(86) PCT No.: PCT/SE2009/051362
§ 371 (c)(1),
(2), (4) Date: Aug. 15, 2012

(87) PCT Pub. No.: WO2011/068444
PCT Pub. Date: Jun. 9, 2011

(65) Prior Publication Data
US 2012/0306332 A1    Dec. 6, 2012

(51) Int. Cl.
*B64C 39/02* (2006.01)
*A63H 27/00* (2006.01)
*B64D 43/00* (2006.01)

(52) U.S. Cl.
CPC ........... *B64C 39/024* (2013.01); *A63H 27/12* (2013.01); *B64C 2201/024* (2013.01); *B64D 43/00* (2013.01)

(58) Field of Classification Search
CPC . B64C 39/024; B64C 39/028; B64C 2211/00; B64C 2201/024; B64D 2700/62166
See application file for complete search history.

(56) References Cited

U.S. PATENT DOCUMENTS

| | | | |
|---|---|---|---|
| 3,950,603 A * | 4/1976 | Brefka | H05K 7/00 174/50 |
| 5,318,855 A | 6/1994 | Glovatsky et al. | |
| 5,386,084 A | 1/1995 | Risko | |
| 5,448,299 A | 9/1995 | Yang et al. | |
| 5,545,494 A | 8/1996 | Trumble et al. | |
| 5,609,312 A * | 3/1997 | Arlton | A63H 27/12 244/108 |
| 6,576,832 B2 * | 6/2003 | Svarfvar | H04M 1/0202 174/392 |

(Continued)

FOREIGN PATENT DOCUMENTS

| DE | 3026243 A1 | 2/1982 |
|---|---|---|
| GB | 1523714 A | 9/1978 |

(Continued)

OTHER PUBLICATIONS

European Search Report—dated Sep. 5, 2013 (Issued in Counterpart Application No. 09851907.7).

(Continued)

*Primary Examiner* — Brian M O'Hara
(74) *Attorney, Agent, or Firm* — Venable LLP; Jeffri A. Kaminski

(57) ABSTRACT

A mounting device for mounting electronic components of an unmanned helicopter. A solid base plate has a circumferential outer edge. A connecting module is fixedly attached to the circumferential outer edge. The connecting module is configured to reversibly connect a flexible cover to the base plate.

13 Claims, 5 Drawing Sheets

(56) References Cited

U.S. PATENT DOCUMENTS

| | | | |
|---|---|---|---|
| 6,844,845 B1 | 1/2005 | Whiteside et al. | |
| 7,325,772 B1* | 2/2008 | Hanewinkel, III | B64D 13/00 165/41 |
| 7,418,838 B2* | 9/2008 | Heo | D06F 37/42 68/213 |
| 2002/0036898 A1 | 3/2002 | Miyakawa et al. | |
| 2006/0277839 A1 | 12/2006 | Nilsson | |
| 2007/0121973 A1 | 5/2007 | Tsang | |
| 2010/0151239 A1* | 6/2010 | Hebert | B32B 7/12 428/351 |

FOREIGN PATENT DOCUMENTS

| | | |
|---|---|---|
| JP | H1053200 A | 2/1998 |
| JP | 2003055806 A | 2/2003 |
| SE | 522233 C2 | 1/2004 |

OTHER PUBLICATIONS

Phillip Gibson et al.: "Convection/diffusion test method for porous textiles", International Journal of Clothing, Science and Technology, vol. 12, No. 2; 2000, pp. 96-113.
PCT/ISA/210—International Search Report—dated Aug. 12, 2010.
PCT/ISA/237—Written Opinion of the International Searching Authority—dated Aug. 12, 2010.

\* cited by examiner

MOUNTING DEVICE FOR ELECTRONIC COMPONENTS IN UAV HELICOPTERS

CROSS-REFERENCE TO RELATED APPLICATIONS

This is the national phase under 35 U.S.C. § 371 of PCT/SE2009/051362 filed 2 Dec. 2009.

FIELD OF THE INVENTION

The present invention relates to mounting devices for electronic components of unmanned aerial vehicle (UAV) helicopters. Mounting devices of the invention comprise a solid base plate and a flexible cover connected to the base plate. The present invention also relates to UAV helicopters comprising such mounting devices and to methods of mounting electronic components to UAV helicopters using the mounting devices.

BACKGROUND OF THE INVENTION

Unmanned aerial vehicle (UAV) helicopters are employed mainly for exploration purposes. UAV helicopters are often operated from naval ships. When helicopters enter the marine environment, e.g., from a naval aircraft carrier, the electronic components get exposed to harsh weather conditions (e.g. moist, salt, wind). Therefore it is an object of present invention to protect the electronic components from these conditions by mounting the electronic components on mounting devices comprising a light, flexible cover.

The electronic components of UAV helicopters are often distributed over the entire aircraft. In order to protect these electronic components from the harsh environmental conditions, the components are often individually protected by mostly solid covers. This is cumbersome, costly and adds additional weight to the helicopter.

Since the helicopter is to be kept as light-weight as possible, conventional protection means, e.g., rigid covers or boxes provided for the individual electronic components are often not appropriate. Total weight of the multiple covers is too high. Furthermore, rigid covers tend to be sensitive to strong vibrations, since this produces heavy mechanical stress. As a result of the heavy mechanical stress, rigid covers often become leaky, or break.

The above problems are solved by the present invention by arranging a major portion of the electronic components of the helicopter on a single mounting device, and covering the mounted electronic components by a single, light-weight, flexible cover.

Flexible covers for protection of electronic components are known in the art.

U.S. Pat. No. 5,545,494 describes an environmental protector for electronic devices in outside terminal boxes. The protector comprises a laminate cover which provides a moisture barrier, penetration resistant surface and EMI shield. The protector may be flexible or substantially rigid and is in the form of an open-ended container for receiving an electronics device. The container is sealed at the open end around a connector unit. U.S. Pat. No. 5,545,494 does not disclose connecting means for reversibly connecting the cover to the base plate.

JP 2003055806 A discloses the protection of electronic components, such as mp3 players, cellular phones, and personal digital assistants (PDAs) by a flexible bag or cloth comprising a water repellent fabric, a waterproof fabric, a moisture permeable waterproof fabric, a moisture absorbing fabric, a pH adjustment fabric, an anti-electric fabric or a shock absorbing fabric.

In view of the above stated prior art, it is an object of the present invention to provide an improved mounting device for the electronic components of UAV helicopters, which mounting device provides for convenient mounting of the electronic components and furthermore provide for a lightweight overall construction. The improved mounting devices are also to provide tolerance against strong vibrations and mechanical stress. It is a further object of the invention to provide an improved mounting device which is simple and easy to install.

SUMMARY OF THE INVENTION

The above objects are achieved by providing an improved mounting device for mounting electronic components of an unmanned helicopter comprising a solid base plate having a circumferential outer edge, and connecting means fixedly attached to said circumferential, outer edge for reversibly connecting a flexible cover to said base plate.

"Electronic components", according to the invention, shall be understood to be any electronic components used on a UAV helicopter, such as, e.g., helicopter's central control system.

The circumferential outer edge shall be understood as being the peripheral part of the base plate. It preferably extends 0.5, 1, 2, 4, 10 cm inwards from the peripheral end of the base plate.

The solid base plate is preferably a metal base plate, such as, e.g., an aluminum base plate, or a plate manufactured from another light-weight metal alloy. The material has preferably good heat conducting properties of above 10, 20, 40, 80, 100, 150, 200 Watts per meter and degree Kelvin.

In a preferred embodiment of the invention, the mounting device, and/or its base plate is substantially saddle-shaped. A saddle shaped mounting device and/or base plate allows compact placement of the electronic components in a rear part of the fuselage, e.g., on (or around) a tail section of the helicopter. The base plate is thus preferably adapted to be mounted on a tail section of the unmanned helicopter.

In another preferred embodiment of the invention, the base plate further comprises an interface plate for providing electrical contacts to peripheral electrical components or instruments. These contacts are preferably adapted to harsh weather conditions, e.g., they comprise waterproof electrical contacts (plugs and/or sockets).

In another preferred embodiment of the invention, said base plate comprises, when mounted on a helicopter, a substantially horizontal part and two substantially vertical parts. Each of said vertical parts may be connected to said horizontal part at opposite sides thereof. Such construction yields the desired "saddle-shaped" base plate, which can conveniently be mounted on a tail section of the helicopter, e.g., in a rear part of the fuselage of the helicopter.

Preferably, the base plate comprises cooling ribs. The cooling ribs are preferably provided on the side opposite from the side on which the electronic components are mounted. The electronic components are preferably mounted on only one side of the base plate.

In a further preferred embodiment, the base plate comprises vibration damping means. This serves to protect the base plate and the electronic components from strong vibrations of the tail of the helicopter, to which the mounting device is mounted. Damping means may be mechanical or elastic damping means. Damping means may also be hydraulic damping means or a combination of mechanical and hydraulic damping means.

In a further preferred embodiment, the connecting means is fixedly attached to said base plate along the entire circumferential outer edge. This provides for an efficient seal between the base plate and the flexible cover around the entire circumferential edge of the base plate. The seal is preferably a water-tight or an air-tight seal.

In a further preferred embodiment, the connecting means comprises a connector selected from the group consisting of zipper connector, e.g., re-sealable zipper connector, or water-tight zipper connector, a zip-lock connector, a snap button connector, and a hook-and-loop fastener connector. These connectors, all known per se, provide for a convenient reversible connection of the flexible cover and the base plate. In a preferred embodiment, the connecting means comprises an interlocking groove and ridge that form a tight seal when pressed together. This type of connection is used in e.g. zip-lock connectors.

A "zipper", according to the invention, is a device for temporarily joining two edges of fabric or flexible material, as it is commonly used in clothing (e.g. jackets and jeans), luggage, sporting goods, camping gear (e.g., tents and sleeping bags), and other daily use items.

In one embodiment, one of said interlocking groove and ridge is directly attached to said circumferential outer edge (without intermediate connecting materials between said groove or ridge and the base plate). The other one of said interlocking groove and ridge is fixedly attached to the flexible cover. This allows for easy connection of the flexible cover to the base plate.

Alternatively, said connecting means may comprise a flexible connecting sheet (or band), fixedly attached to said base plate at a first side of said connecting sheet, and a connector being provided on an opposing second side of the connecting sheet (or band). This embodiment is particularly preferred, if the connector is a zipper-type connector. The sheet may be 1, 2, 4, 10 cm in breadth.

Preferably, the flexible cover is waterproof. In some instances, it is advantageous if said flexible cover is breathable. In another preferred embodiment the flexible cover is heat resistant. A cover is heat resistant, according to the invention, if it can withstand temperatures of more than 45, 100, 200, 400, 800, or preferably 1600 degrees Celsius. Preferred flexible covers are elastic. The cover may be transparent.

Preferably, the flexible cover has a breathability (resistance to the diffusion of water vapor, measured in s/m) of less than 2000, preferably less than 1000, 800, 600, 500, 400 m/s at a mean relative humidity of 0.5, as measured by the method of Gibson (Gibson et al., Convection/Diffusion Test Method for Porous Textiles, International Journal of Clothing Science and Technology 12 (2), 2000).

For a fabric to be classified as waterproof it needs to withstand water pressure applied from a 1 meter high column, and not leak. Flexible covers of the invention preferably withstand water pressure applied by a 10, 20, 40, 60 or 100 cm high water column without leaking.

The flexible cover may comprise a textile fabric cover, a breathable textile fabric cover, a breathable polymer sheet, a breathable membrane sandwiched between textile sheets, a flexible PVC cover, a thermoplastic polymer cover. The flexible cover may comprise multiple layers of flexible material. It may also comprise a metal foil or film. Preferably said flexible cover comprises a layer conferring protection against electromagnetic radiation, such as an electromagnetic induction (EMI) protection layer.

In one embodiment, said flexible cover comprises a closable opening for allowing access to electronic components underneath the cover. The closable opening, when closed, preferably provides a waterproof (or air-tight) seal.

It is furthermore preferred that the cover is provided with a closable valve for releasing air from beneath the cover. The valve may also be used to actively withdraw air from beneath the cover, which results in a more compact package.

The flexible cover may also comprise a water drain, such as a valve or water absorption means. The water drain may be a valve for releasing water from underneath the cover, or may comprise absorption means such as a sponge or a hygroscopic material.

In preferred mounting devices, the electronic components are sealed between the base plate and the flexible cover, preferably by means of an air-tight seal or a waterproof seal.

The present invention furthermore relates to the above described mounting devices, wherein said mounting devices further comprise said flexible cover, i.e., the (still removable) cover forms part of the mounting device.

The present invention further relates to an unmanned helicopter comprising a mounting device as described above. Preferably, the unmanned helicopter comprises mounting device as described above, and the mounting device is mounted beneath an outer body panel of the helicopter's fuselage.

The present invention further relates to a method of mounting electronic components on a UAV helicopter, said method comprising, in any order, mounting said electronic components on a mounting device as described above; sealing said electronic components between the base plate of the mounting device and the flexible cover (e.g. by closing the connector means); and mounting said mounting device to the UAV helicopter.

DETAILED DESCRIPTION OF THE INVENTION

The present invention relates to mounting devices 1 for mounting the electronic components of helicopters at a central place within the aircraft. The invention relates further to flexible covers 5 for protecting the electronic components mounted on mounting devices of the invention from environmental factors, such as wind, salt and extreme temperatures.

Figure 2:
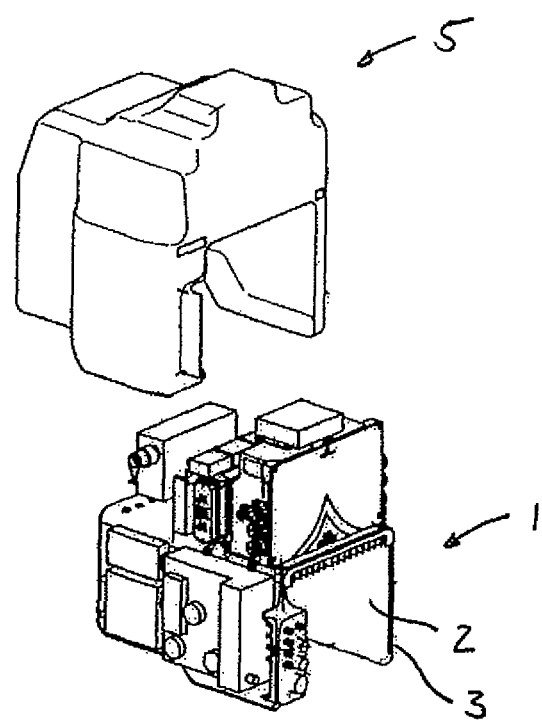
FIG. 2 shows a mounting device of the invention, with electronic components and a flexible cover.
Figure 3:
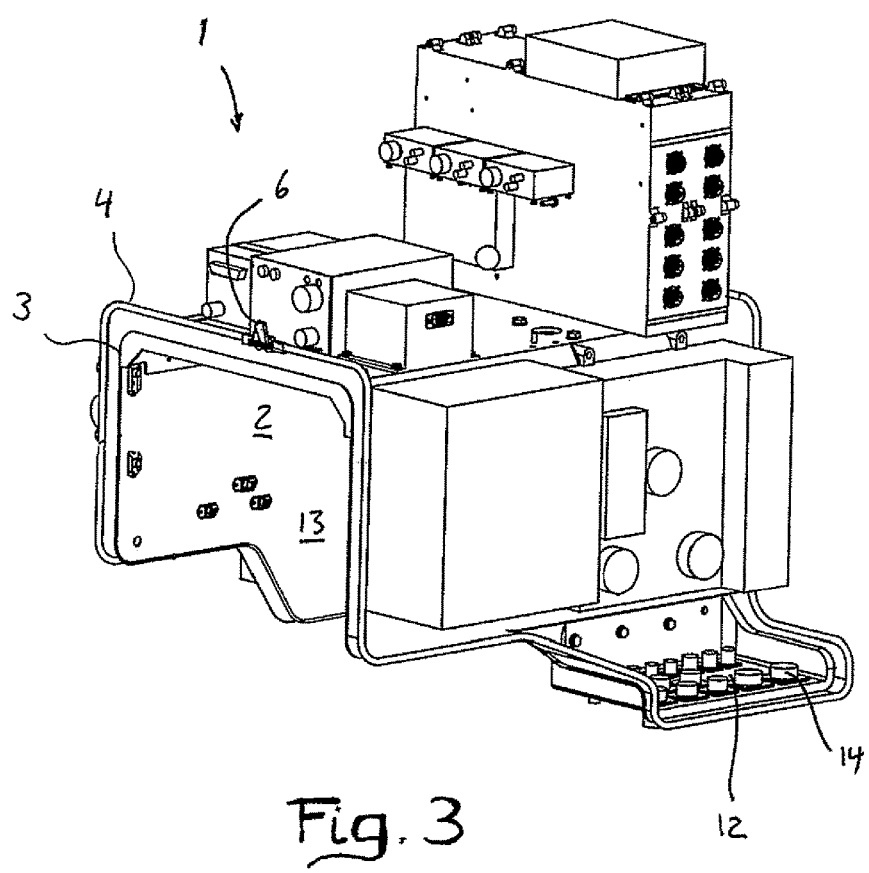
FIG. 3 shows a mounting device of the invention without the flexible cover.
Figure 4:
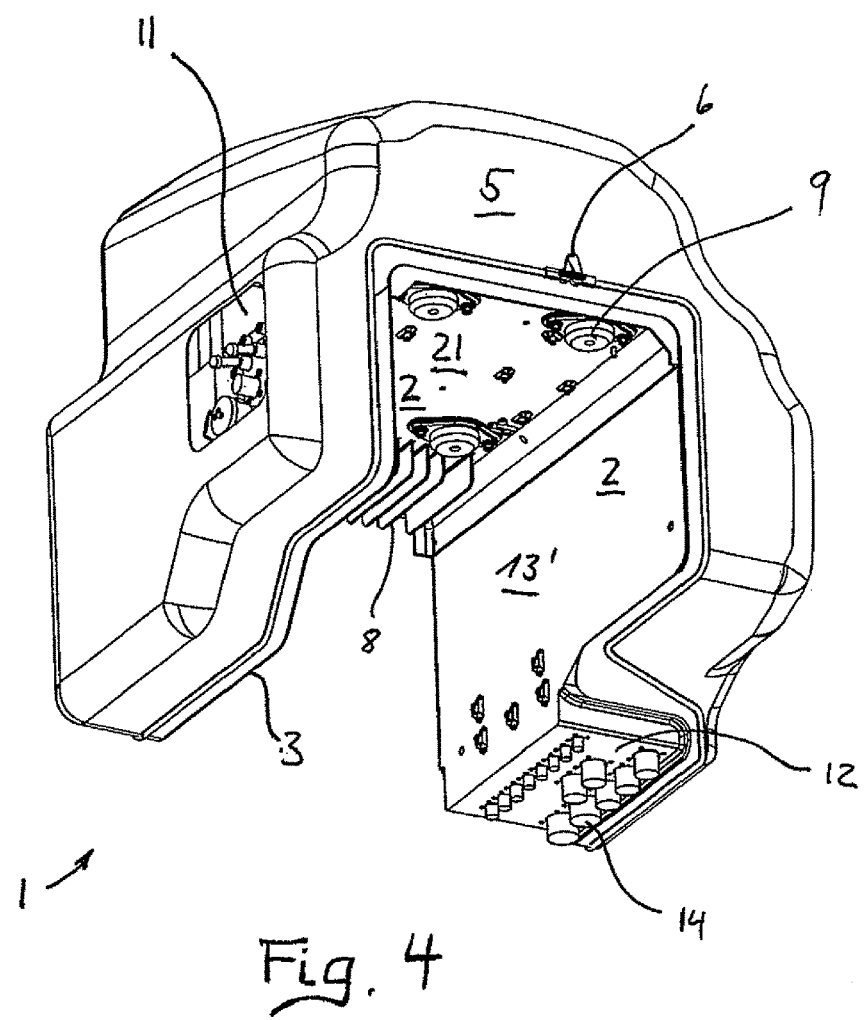
FIG. 4 shows a mounting device of the invention with the flexible cover of the invention.

As can best be seen in FIGS. 3 and 4, mounting device 1 comprises a solid base plate 2, preferably made of lightweight material, such as aluminum or another light-weight metal alloy. One important feature of the base plate 2 is that it has good thermal conductivity. In the embodiments shown in FIGS. 2, 3 and 4, base plate 2 essentially comprises four parts, a substantially horizontal part 21, two substantially vertical parts 13, 13' and an interface plate 12. The horizontal part is preferably milled out of a single block of aluminum. At each of its longer sides one of the vertical parts 13, 13' is attached. The attachment of the vertical parts 13, 13' may be a sealed connection. An interface plate 12 is connected to one of the vertical parts 13, 13', which comprises socket means 14 for connection to corresponding plug means of peripheral electrical devices. These socket means 14 provide an external access to the electronic components under flexible cover 5. All socket means 14 are sealed. Socket means 14 are preferably waterproof sockets.

Figure 1:
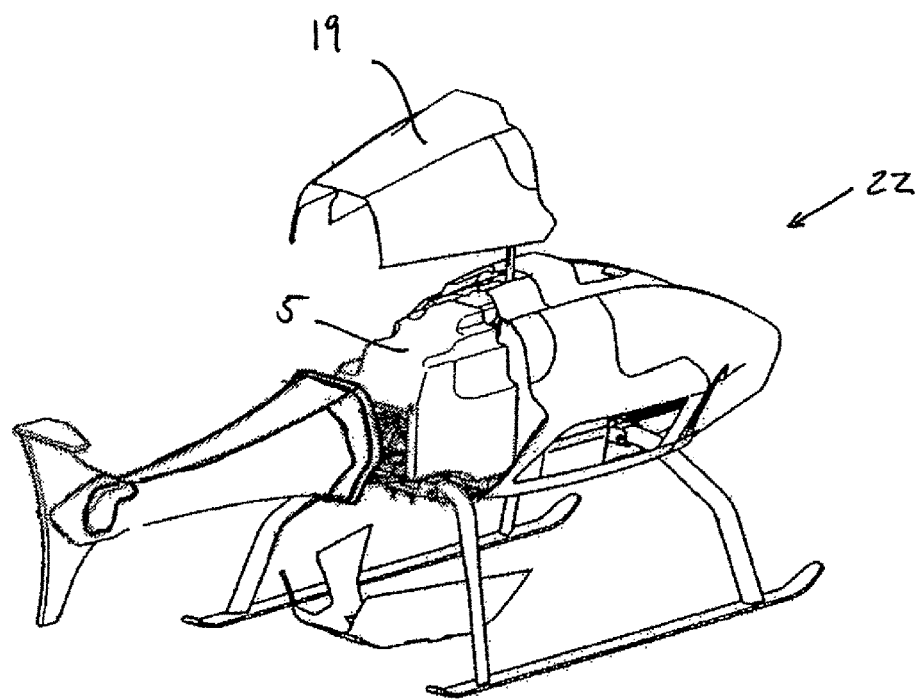
FIG. 1 shows a UAV helicopter of the invention.

As can best be seen in FIG. 1, the mounting device 1 with electronic components and the flexible cover 5 are mounted under, and covered by, the body panels (19) forming the helicopter's fuselage.

Base plate 2 has a circumferential outer edge 3. The circumferential outer edge 3 is preferably rounded off and/or chamfered, in order to avoid any damage to the flexible cover by sharp edges.

Figure 5:
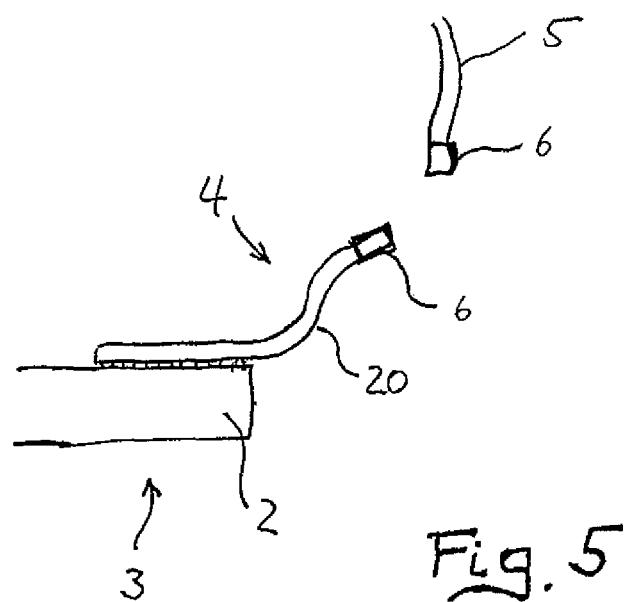
FIG. 5 shows connecting means of the invention, comprising a flexible connecting sheet fixedly attached to the base plate.

As can best be seen in FIG. 5, connecting means 4 is fixedly attached to the circumferential outer edge 3, for connecting a flexible cover 5 to the base plate 2. Connecting means 4 comprises a flexible connecting sheet 20 fixedly attached to the base plate 2 along the circumferential outer edge 3. Flexible connecting sheet (or band) 20 can be glued to the base plate 2, or be attached thereto with screws, nuts or bolts. Quick fasteners, such as bayonet joints are also contemplated. Connecting means 4 further comprises connector 6 that provide for the reversible attachment of flexible cover 5 to the flexible connecting sheet 20. Preferred connectors are zippers. The connection between connecting means 4 and base plate 2 is preferably sealed, or an otherwise air-tight and/or waterproof connection.

If the connector 6 is a zipper, then one part of the connector is preferably attached to the flexible connection sheet, while the other part is attached to the flexible cover 5. In another embodiment, connector 6 is directly attached to the base plate 2, e.g., when using snap fasteners, hook-and-loop fasteners, or zip-lock type connections.

All connectors 6 preferably provide a water-tight, air-tight releasable connection.

When a zipper is used, one part of the zipper may be glued to base plate 2 along the circumferential outer edge of the base plate. The other half of the zipper is fixedly connected, e.g., sawn and sealed, to the edge of the flexible cover 5.

In order to transfer heat generated by the electronic components mounted on the base plate 2, cooling ribs (or flanges) 8 are provided on the bottom side of base plate 2. Cooling may further be supported by airflow through channels in the fuselage body of the helicopter.

The cooling ribs 8 are preferably monolithically milled out of the same aluminum block as base plate 2. Alternatively, the cooling ribs 8 may be separately mounted on the bottom side of the base plate. A fan may be incorporated to provide for even more efficient cooling of the base plate 2.

In an alternative embodiment, base plate 2 comprises a rig for mounting a heat pipe and/or a water cooling pipeline.

The flexible cover 5 may provide protection against electromagnetic interferences (EMI). In this case, connection means and seals are conductive to prevent electrical arcing, static sparks, and the overall build-up of charge within rubber that may cause it to behave like a capacitor.

Base plate 2 is connected to the helicopter through damping means 9. This is to dampen the oscillations/vibrations caused by the main rotor and the engine. The damping means 9 shown in FIG. 4 comprise mechanical damping means, e.g., rubber plates or springs. The damping means 9 are connected to the fuselage of the helicopter by screws, but other ways of mounting may be conceivable, such as bayonet joints, or quick fasteners.

Flexible cover 5 shown in FIGS. 2 and 4 is preferably made out of textile fabric. The cover may comprise a waterproof yet breathable membrane. The textile fabric may comprise thermoplastic fibers, aramid fibers (e.g. Twaron) which have flame-retardant, cut-protection and armor characteristics. Other fibers for the cover 5 may be acrylic fibers, nylon fibers, polyurethane fibers, hydrophobic olefin fibers, polylactide fibers or metallic fibers, such as Lurex. Another possible textile fabric is Gore-Tex, which is a waterproof and breathable fabric. Flexible cover 5 may also be a Latex cover or other natural and/or synthetic materials that offer same characteristics as Latex.

Since there is normally air entrapped under the flexible cover 5, the expansion of the enclosed air at decreasing pressures (high altitudes) has to be considered. Therefore, in one preferred embodiment, the flexible cover 5 is breathable. The breathable cover allows air to pass through the cover for pressure adjustment. In extreme cases, this will help to avoid explosion of the cover. Alternatively, pressure adjustment valves or strong flexible cover materials can be used.

As can be seen in FIGS. 1 and 4, flexible cover 5 fits tightly around the electronic components mounted on the base plate 2.

As shown in FIG. 4, flexible cover 5 may include an opening 11 for allowing access to the electronic components beneath flexible cover 5. This opening gives access to a specific area under the flexible cover 5, e.g., for maintenance purposes. Preferably, opening 11 is re-closable. The re-closable opening 11 to may comprise the same type of reversible connection means as connecting means 4 for the attachment of the flexible cover 5 to the base plate 2.

The mounting device 1 preferably comprises water drain means, such as water drain channels or water traps on the inside of the flexible cover 5. It may also comprise water drain valves to eliminate accumulated water beneath the cover.

In alternative embodiments, the water drain means comprise water absorbent means, e.g., a sponge or a hygroscopic material.

Another possibility of preventing condensation of water is the incorporation of a valve for connecting a vacuum pump to withdraw air, potentially humid air, from within the flexible cover 5. The flexible cover 5 may also have a water drain valve and/or an air-exhaustion valve for a vacuum pump combined within one and the same device.

As can be seen in FIGS. 1 to 4, base plate 2 assumes the shape of a horse saddle. This saddle-shaped construction allows convenient mounting on the mounting device, e.g., on and partly around a tail section of the helicopter, preferably at a rear part of the fuselage (see FIG. 1). The placement of the main electronic components of the helicopter at one central place within the helicopter, on a single base plate 2 allows easy maintenance and/or replacement of the electronic components.

The invention claimed is:
1. A mounting device for mounting electronic components of an unmanned helicopter, the mounting device comprising:
   a base plate having a circumferential outer edge, the electronic components being mounted on only one side of the base plate,
   a flexible cover, and
   a connecting module fixedly attached to said circumferential outer edge, and configured to reversibly connect the flexible cover to said base plate, thereby sealing the electronic components between the base plate and the flexible cover,
wherein the mounting device is adapted to be mounted under an outer body panel of a fuselage of the unmanned helicopter,
wherein said flexible cover is a textile fabric cover.

2. The mounting device according to claim 1, wherein said connecting module is fixedly attached to said base plate along the entire circumferential outer edge.

3. The mounting device according to claim 1, wherein said base plate is substantially saddle-shaped.

4. The mounting device according to claim 1, wherein said base plate comprises, when mounted on a helicopter, a substantially horizontal part and two substantially vertical parts, each of said vertical parts provided at opposite sides of said horizontal part.

5. The mounting device according to claim 1, wherein said base plate further comprises an interface plate for providing electrical contacts for peripheral electrical components.

6. The mounting device according to claim 1, wherein said base plate comprises cooling ribs.

7. The mounting device according to claim 1, wherein said connecting module comprises a connector selected from the group consisting of zipper connector, water-tight zipper connector, snap button connector, hook-and-loop fastener, and an interlocking groove and ridge that form a tight seal when pressed together.

8. The mounting device according to claim 7, wherein said connecting module comprises said connector, and wherein a first part of said connector is directly attached to said circumferential outer edge, a second part of said connector is connected to said flexible cover.

9. The mounting device according to claim 8, wherein said connecting module comprises a flexible connecting sheet fixedly attached to said base plate at a first side of said connecting sheet, and said connector being provided on the opposing second side of the connecting sheet.

10. The mounting device according to claim 1, wherein said flexible cover is waterproof and breathable.

11. The mounting device according to claim 1, wherein said flexible cover comprises a closable opening for allowing access to electronic components underneath the cover.

12. An unmanned helicopter, comprising:
a mounting device comprising a base plate having a circumferential outer edge, electronic components being mounted on only one side of the base plate, a flexible textile fabric cover, and a connecting module configured to be fixedly attached to said circumferential outer edge, wherein the connecting module is configured to reversibly connect the flexible cover to said base plate, thereby sealing the electronic components between the base plate and the flexible cover, wherein the mounting device is adapted to be mounted under an outer body panel of a fuselage of the unmanned helicopter.

13. A method of mounting electronic components to an unmanned helicopter, the method comprising:
mounting said electronic components on only one side of a mounting device comprising a base plate having a circumferential outer edge,
reversibly connecting a flexible cover to the base plate with a connecting module configured to be fixedly attached to said circumferential outer edge, thereby sealing the electronic components between the base plate and the flexible cover;
mounting said mounting device under an outer body panel of a fuselage of the unmanned helicopter,
wherein said flexible cover is a textile fabric cover.

* * * * *